United States Patent [19]
Barksdale

[11] Patent Number: 5,870,236
[45] Date of Patent: Feb. 9, 1999

[54] TOWING MIRROR EXTENSION

[76] Inventor: Brian Barksdale, 10100 NW. Meadow La., Parkville, Mo. 64152

[21] Appl. No.: 850,497

[22] Filed: May 2, 1997

[51] Int. Cl.[6] .............................. G02B 5/08; G02B 5/10; B60R 1/06
[52] U.S. Cl. .................. 359/872; 359/873; 248/467; 248/361; 248/362; 248/201; 224/554; 224/558
[58] Field of Search .................................. 359/872, 873; 248/467, 361, 362, 201; 224/554, 558

[56] References Cited

U.S. PATENT DOCUMENTS

| | | | |
|---|---|---|---|
| 3,048,084 | 8/1962 | Iannuzzi | 359/865 |
| 3,701,507 | 10/1972 | Bell | 248/467 |
| 4,111,532 | 9/1978 | Budish | 248/481 |
| 4,381,142 | 4/1983 | McColgan | 359/865 |
| 4,486,075 | 12/1984 | Cohen | 359/840 |
| 4,832,476 | 5/1989 | Gabrielyan | 359/865 |
| 4,863,254 | 9/1989 | Dyer | 359/850 |
| 4,892,400 | 1/1990 | Brookes et al. | 359/865 |
| 4,892,401 | 1/1990 | Kittridge et al. | 359/850 |
| 4,921,340 | 5/1990 | Dyer | 359/864 |
| 5,296,973 | 3/1994 | Burke | 359/865 |

*Primary Examiner*—Cassandra Spyrou
*Assistant Examiner*—Mohammad Sikder
*Attorney, Agent, or Firm*—Hovey, Williams, Timmons & Collins

[57] ABSTRACT

The preferred towing extension mirror apparatus includes a support strap, an extension mirror coupled with one end thereof, and coupling assemblies for coupling the strap with the side mirror assembly of the vehicle adjacent the rear side of the side mirror housing. One coupling assembly couples the strap with the side mirror housing on the outboard side of the side mirror, and the other coupling assembly couples with a support rod extending from the vehicle adjacent the inboard side of the side mirror housing.

3 Claims, 2 Drawing Sheets

TOWING MIRROR EXTENSION

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of extension mirrors for vehicles. In particular, the invention is concerned with an extension mirror apparatus having a support strap, an extension mirror coupled with one end thereof and coupling assemblies for coupling the strap with the side mirror assembly of the vehicle adjacent the rear side of the side mirror housing.

2. Description of the Prior Art

When a vehicle such as an automobile or a pickup truck is towing a trailer, the width of the trailer may block the driver's vision through the vehicle's side mirrors. To solve this problem, the prior art has provided different types of extension mirrors that connect to the vehicle or connect to the side mirror assemblies of the vehicle. These prior art extension mirrors tend to be mechanically complex and uneconomical to manufacture.

SUMMARY OF THE INVENTION

The present invention solves the prior art problems discussed above and provides a distinct advance in the state of the art. In particular, the towing mirror extension hereof is mechanically simple and thereby economical to manufacture.

The preferred extension mirror apparatus includes a support strap, an extension mirror coupled with the strap adjacent one end thereof, and a pair of coupling assemblies for coupling the strap adjacent the rear side of the side mirror assembly of a vehicle. One of the coupling assemblies couples the strap with the side mirror housing on the outboard side of the side mirror. The other coupling assembly couples the other end of the strap with the support rod supporting the side mirror housing on the inboard side thereof. This configuration enables unobstructed vision through the side mirror and unobstructed adjustment of the side mirror. Other preferred aspects of the present invention are discussed herein.

DETAILED DESCRIPTION OF THE PREFERRED EMBODIMENT

Figure 1:
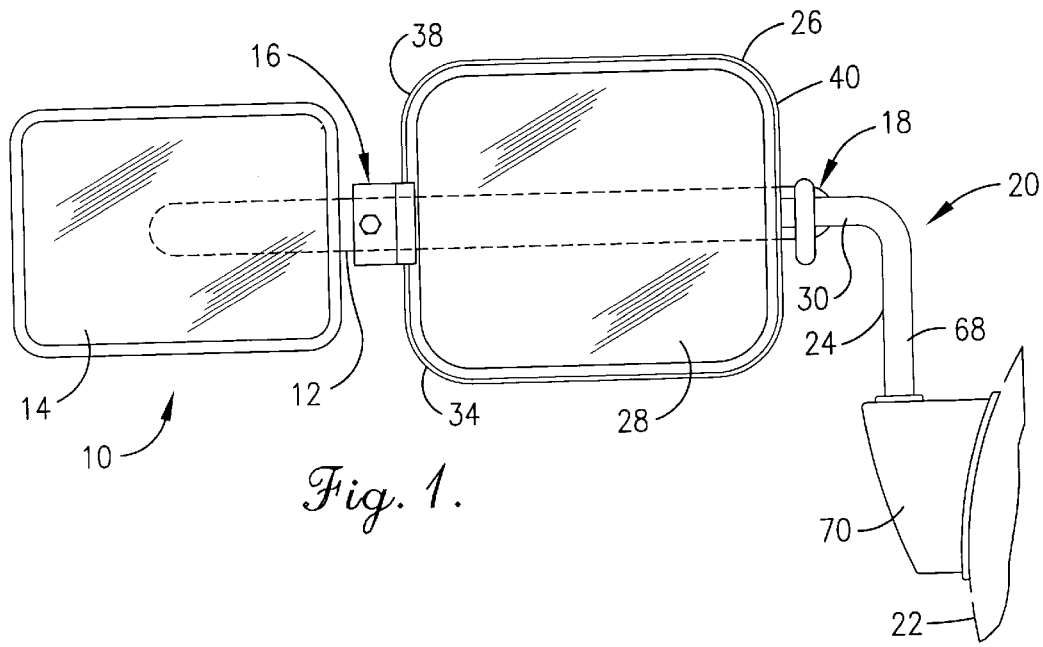
FIG. 1 is a front elevational view of the extension mirror apparatus in accordance with the present invention shown in use with the side mirror assembly of a vehicle.

The drawing figures illustrate the preferred extension mirror apparatus 10 in accordance with the present invention. Apparatus 10 includes support strap 12, extension mirror 14, outboard coupling assembly 16 and inboard coupling assembly 18.

Apparatus 10 is illustrated in use with side mirror assembly 20 of vehicle 22. Assembly 20 is the type typically found on pick-up trucks and includes L-shaped support rod 24 having one end connected to vehicle 22, side mirror housing 26 connected to the distal end of rod 24, and side mirror 28. Support rod 24 includes horizontal section 30 adjacent the inboard side of housing 26. Housing 26 is configured to present mirror-receiving cavity 32 surrounded by rim 34. Side mirror 28 is adjustably received in cavity 32 with the edges of mirror 28 spaced from rim 34 in order to allow for tilting adjustment in order to change the field of view. Housing 26 presents rear side 36 opposite side mirror 28 and further includes outboard side 38 and inboard side 40.

Support strap 12 presents outboard end 42 and inboard end 44, and includes first coupling hole 46 defined therethrough intermediate of ends 42, 44 and second coupling hole 48 defined therethrough adjacent inboard end 44. Extension mirror 14 is coupled with support strap 12 adjacent outboard end 42.

Figure 3:
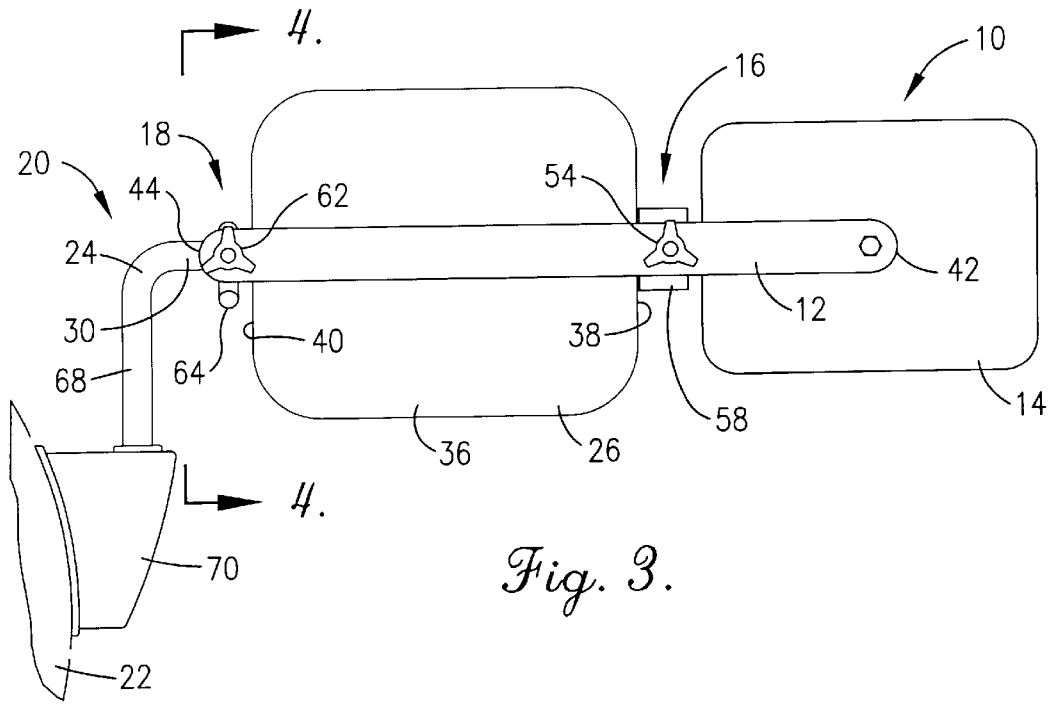
FIG. 3 is a rear elevational view of the apparatus of FIG. 1.

Outboard coupling assembly 16 includes coupling member 50, bolt 52 and lock nut 54. Coupling member 50 is preferably composed of sheet metal presenting a planar cross section. Member 50 includes hook-shaped portion 56 configured for receiving and thereby engaging rim 34 and further includes transverse flange 58 having a hole defined therein for receiving bolt 52 with a head thereof on the side of flange 58 opposite support strap 12. First coupling hole 46 in strap 12 is positioned in registration with bolt 52 which is received through hole 46 and threadably secured by lock nut 54. Nut 54 presents a winged configuration as best illustrated in FIG. 3 for easy grasping and adjustment.

Figure 2:
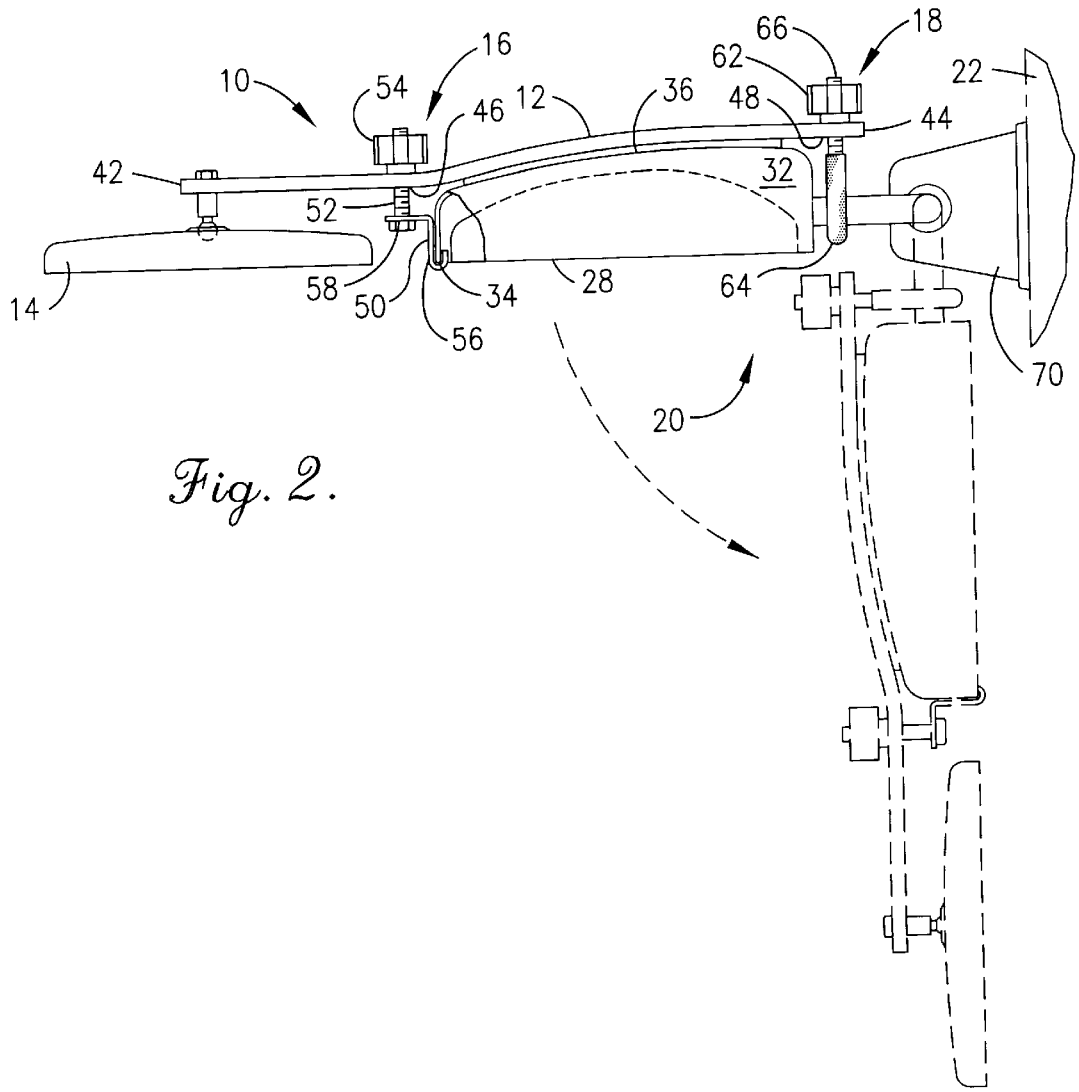
FIG. 2 is a plan view of the apparatus of FIG. 1 with phantom lines showing the vehicle side mirror assembly in the retracted position.
Figure 4:
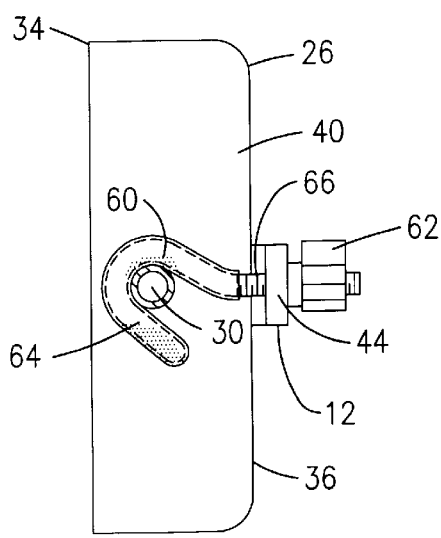
FIG. 4 is a view in partial section taken along line 4—4 of FIG. 3.

Inboard coupling assembly 18 includes coupling body 60 and lock nut 62. Body 60 presents a hook-shaped portion 64 presenting a circular cross section and is configured for receiving and thereby engaging horizontal section 30 of vehicle support rod 24. Coupling body 60 also includes threaded portion 66 with second coupling hole 48 configured for receiving threaded portion 66. Lock nut 62 threadably secures coupling body 60 to support strap 12 in the orientation shown in FIGS. 2 and 4.

In order to install apparatus 10, the installer rotates lock nuts 54 and 62 so that coupling member 50 and coupling body 60 present as much extension as possible while remaining engaged with nuts 54, 62. The installer then positions apparatus 10 with support strap 12 adjacent rear side 36 of housing 26, outboard coupling assembly 16 adjacent the outboard side of housing 26, and inboard coupling assembly 18 adjacent the inboard side of housing 26.

Next, the installer places hook-shaped portion 56 of outboard coupling assembly 16 over rim 34 on the outboard side of vehicle side mirror 28. While supporting apparatus 10, the installer then places hook-shaped portion 64 of inboard coupling assembly 18 over horizontal section 30 of vehicle support rod 24.

With apparatus 10 remaining supported, the installer then rotates lock nuts 54, 62 until support strap 12 is snugly engaged against rear side 36 of housing 26. During the process of tightening nuts 54, 62, the installer can make positioning adjustments to strap 12 in order to place extension mirror 14 in alignment with side mirror 28. Apparatus 10 can be removed by performing the steps described above in reverse order.

In the preferred embodiment, support strap 12 is configured to conform generally to the shape of rear side 36. This allows nuts 54, 62 to be tightened sufficiently to hold apparatus 10 firmly coupled with side mirror assembly 20 without damaging housing 26. Even with this configuration, it will be appreciated that one of nuts 54, 62 can be tightened while the other is loosened in order to position extension mirror 14 forwardly or rearwardly as desired by the installer.

As illustrated in FIG. 1, support rod 24 includes vertical section 68 that is received in bracket 70 attached to vehicle 22. This arrangement allows rotation of assembly 20 about the axis defined by vertical section 68 to the retracted position illustrated by the phantom lines in FIG. 2. Thus, if any portion of apparatus 10 were to be struck by an object, rotation toward the retracted position would occur, thereby minimizing potential damage. Those skilled in the art will now appreciate that apparatus 10 presents a mechanically simple structure allowing economical manufacture while at the same time providing high utility for extending the rear vision of the driver of a vehicle towing a trailer.

Those skilled in the art will also appreciate that the present invention includes many variations in the preferred embodiment described herein. These variations include the materials used to make up the components of apparatus 10 and the various shapes and configurations thereof.

Having thus described the preferred embodiments of the present invention, the following is claimed as new and desired to be secured by letters patent:

What is claimed is:

1. An extension mirror apparatus for use with a side mirror assembly of a vehicle, the assembly including a support rod extending from the vehicle, a mirror housing coupled with a distal end of the rod and having a mirror-receiving cavity defined therein, and a side mirror received in the cavity, the housing presenting a rear side opposite the side mirror, said apparatus comprising:

a support strap having a first end and a second end;

an extension mirror coupled with said strap adjacent said first end; and coupling means for coupling said strap with the housing of the side mirror assembly, for positioning said strap in spanning relationship with the housing adjacent the rear side thereof, and for positioning said extension mirror outboard of the side mirror, said coupling means including means for coupling the rod adjacent an inboard side of the housing with said strap adjacent said second end and for coupling said strap with the housing outboard of the side mirror.

2. The apparatus as set forth in claim 1, said coupling means including means for releasably drawing said strap against the rear side of the housing.

3. The apparatus as set forth in claim 1, the housing having a rim circumscribing the cavity, spaced from the side mirror, and presenting a rim portion adjacent the outboard side of the side mirror, the rod presenting a horizontal section adjacent the inboard side of the housing, said strap including a first hole intermediate of said ends and a second hole adjacent said second end, said coupling means including a first hook-shaped member, configured for engaging the rim portion, having a threaded portion configured for insertion through said first hole, a first nut configured for a threadably coupling with said threaded portion for retaining said threaded portion through said first hole, a second hook-shaped member, configured for engaging the horizontal section of the rod, having a threaded body configured for insertion through said second hole, and a second nut configured for threadably coupling with said threaded body for retaining said threaded body through said second hole, said nuts being configured for drawing said threaded portion in threaded body through said holes respectively for releasably securing said strap against the rear side of the housing.

* * * * *